(12) United States Patent
Wong

(10) Patent No.: US 8,645,215 B1
(45) Date of Patent: Feb. 4, 2014

(54) SYSTEM AND METHOD FOR SALES TAX AUTOMATIC DECLARATION

(71) Applicant: Kamfu Wong, Shatin (HK)

(72) Inventor: Kamfu Wong, Shatin (HK)

(*) Notice: Subject to any disclaimer, the term of this patent is extended or adjusted under 35 U.S.C. 154(b) by 0 days.

(21) Appl. No.: 13/681,977

(22) Filed: Nov. 20, 2012

(51) Int. Cl.
   *G06Q 20/20* (2012.01)

(52) U.S. Cl.
   USPC ............... 705/19; 705/31; 705/26.8; 705/20; 705/39; 705/322; 707/999; 235/375

(58) Field of Classification Search
   USPC ........ 705/19, 31, 26.8, 27.1, 20, 21; 707/999; 235/375
   See application file for complete search history.

(56) References Cited

U.S. PATENT DOCUMENTS

| | | | |
|---|---|---|---|
| 6,983,261 B1 * | 1/2006 | Francisco et al. ............... | 705/39 |
| 6,993,502 B1 * | 1/2006 | Gryglewicz et al. ............ | 705/31 |
| 8,249,936 B1 * | 8/2012 | Francisco et al. ............... | 705/19 |
| 2002/0052792 A1 * | 5/2002 | Johnson et al. ................ | 705/19 |
| 2002/0143655 A1 * | 10/2002 | Elston et al. .................... | 705/26 |
| 2003/0126018 A1 * | 7/2003 | LaMotta et al. ................ | 705/19 |

* cited by examiner

*Primary Examiner* — Vanel Frenel

(74) *Attorney, Agent, or Firm* — Maine Cernota & Rardin

(57) ABSTRACT

An automatic sales tax declaration system includes a control center, a point of sale (POS) terminal at a shop, a declaration machine accessible to a customer, and a tax declaration card. The POS terminal and the declaration machine both communicate with the control center via a mobile telecommunication network. When a sale is made, the merchant collects the payment using the POS terminal, which records customer tax information on the tax declaration card and transmits merchant tax information to the control center. Subsequently, the customer uses the tax declaration card and the declaration machine to transmit the customer tax information to the control center. The control center calculates the sales tax based on the customer and merchant tax information. If the control center does not receive merchant tax information corresponding to the customer tax information, it concludes that the merchant may have attempted to conceal sales and evade taxes.

11 Claims, 2 Drawing Sheets

SYSTEM AND METHOD FOR SALES TAX AUTOMATIC DECLARATION

FIELD

The subject application relates to the field of financial transactions. In particular, the subject application relates to systems and methods for automatic declaration of sales taxes.

BACKGROUND

Taxes are a main source of a state's financial income, and sales taxes provide an important contribution to the overall tax revenue. Sales taxes are imposed according to the total sales declared by merchants. Therefore, the procedures used by merchants to declare taxes are important. Some merchants conceal parts of their trade in order to evade sales taxes, especially when payments are in cash, since there is no traceable bank record of such cash payments, and tax offices will therefore not be able to discover them. Such unreported cash transactions thereby reduce the state's tax income. Therefore, there is a problem of how to prevent merchants from concealing taxable trades.

SUMMARY

The objective of the present invention is to provide a system and method for automatically declaring sales taxes, in order to prevent merchants from concealing taxable trades.

This objective is achieved by employing an automatic tax declaration system, comprising: a tax control center (1); tax control POS (point of sale) terminals (2); a tax declaration machine (3); and customer tax declaration cards (4), wherein the tax control POS terminal (2) communicates digitally with the tax control center (1) via a mobile telecommunication network (5), the tax declaration machine (3) conducts digital communication with the tax control center (1) via the mobile telecommunication network (5), and wherein when the customer makes payment in a shop, the merchant collects money by using the tax control POS terminal (2) and then the tax control POS terminal (2) transfers customer tax declaration information to the customer's tax declaration card (4) and transfers merchant tax declaration information to the tax control center (1) via the mobile telecommunication network (5). After making the payment, the customer puts the tax declaration card (4) on the tax declaration machine (3), which reads the customer tax declaration information in the tax declaration card (4) and transfers it to the tax control center (1) via the mobile telecommunication network (5). The tax control center (1) calculates the sales tax of the merchant based on the received customer tax declaration information and merchant tax declaration information.

In addition, said objective is achieved by using an automatic declaration method employing said system and comprising: setting up a tax control center (1) and tax declaration machines (3) at a plurality location in order to accommodate customers; and setting up tax control POS terminals (2) at each shop, wherein each tax control POS terminal (2) communicates digitally with the tax control center (1) via the mobile telecommunication network (5), the tax declaration machine (3) conducts digital communication with the tax control center (1) via the mobile telecommunication network (5), and wherein when the customer makes payment in a shop, after the merchant collects the money using the tax control POS terminal (2), the tax control POS terminal (2) transfers customer tax declaration information to the customer's tax declaration card (4) and transfers merchant tax declaration information to the tax control center (1) via the mobile telecommunication network (5). After payment, the customer puts the tax declaration card (4) on the tax declaration machine (3), which reads the customer tax declaration information in the tax declaration card (4) and transfers it to the tax control center (1) via mobile telecommunication network (5). The tax control center (1) calculates the sales tax of the merchant based on the received customer tax declaration information and merchant tax declaration information.

Therefore, the above-mentioned problem is solved and the objective is achieved.

With the automatic declaration system and method disclosed in the present application, the tax control POS terminal (2) is capable of declaring the trade to the tax control center (1) immediately after the trade is finished, and the customer can declare his/her tax information to the tax control center (1) with the tax declaration machine (3) with his/her tax declaration card (4), preventing the merchant from concealing trades.

BRIEF DESCRIPTION OF THE DRAWINGS

In the drawings, the same reference numerals are used to refer to the same systems, devices and elements. The drawings show the inventions schematically, and are intended to illustrate the structure and main characters of the present invention.

DETAILED DESCRIPTION

The present application is now described in detail with reference to the drawings.

Figure 1:
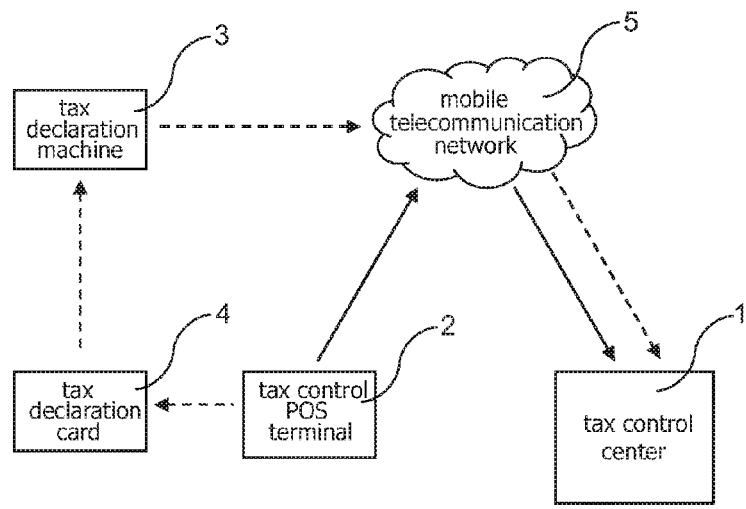
FIG. 1 is a structure diagram of the sales tax automatic declaration system according to an embodiment of the present invention.
Figure 2:
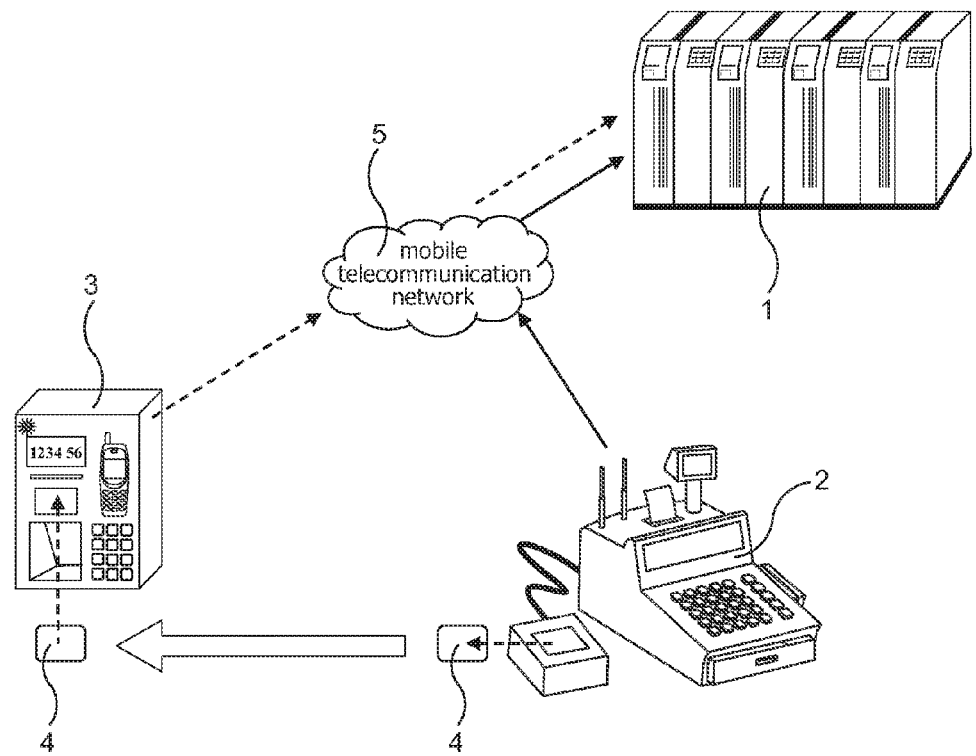
FIG. 2 is a visualization diagram of the sales tax automatic declaration system according to an embodiment of the present invention.

Referring to FIGS. 1 and 2, illustrated is a structure diagram of the sales tax automatic declaration system, and a visualization diagram of the sales tax automatic declaration system according to embodiments of the present invention, respectively. In FIGS. 1 and 2, the system comprises tax control center (1), tax declaration POS terminals (2) at each shop; and tax declaration machines (3) at a plurality locations in order to facilitate customers' tax declarations. The tax control POS terminal (2) conducts digital communication with the tax control center (1) via mobile telecommunication network (5), the tax declaration machine (3) conducts digital communication with the tax control center (1) via the mobile telecommunication network (5), and when the customer makes a payment in a shop, after the merchant collects the money using the tax control POS terminal (2), the tax control POS terminal (2) transfers customer tax declaration information to the customer's tax declaration card (4), and transfers merchant tax declaration information to the tax control center (1) via mobile telecommunication network (5). After making the payment, the customer puts the tax declaration card (4) on the tax declaration machine (3), which reads the customer tax declaration information in the tax declaration card (4) and transfers it to tax control center (1) via mobile telecommunication network (5). The tax control center (1) calculates the sales tax of the merchant based on the received customer tax declaration information and merchant tax declaration information.

According to the present invention, tax declaration information is declared separately by customers and merchants. As shown in FIG. 1, the solid lines with arrows represent transmitting the merchant tax declaration information from the tax control POS terminal (2) to the tax control center (1), and the dashed lines with arrows represent transferring customer tax declaration information from the customer's tax declaration card (4) to tax control center (1) via the tax declaration machine (3). Referring again to FIG. 1, the illustrated tax control POS terminal (2) is distributed to the merchants by the tax control center (1) and is installed with tax control modules by which the tax control terminal (2) conducts digital communication with the tax control center (1). The tax control POS terminal (2) can automatically transfer the related merchant tax declaration information of the trade to the tax control center (1). Additionally, the present application provides the mechanism of tax declaration by the customers, through which each customer, after payment, transfers customer tax declaration information to the tax control center (1) with the tax declaration machine (3) to declare his/her tax. Based on the tax declarations by both the merchant and the customers, tax evasion can be effectively prevented. Based on the received customer tax declaration information, the tax control center (1) examines the merchant tax declaration information, and when the corresponding merchant tax declaration information is absent, it suggests that the merchant may not have transmitted the corresponding tax declaration information to the tax control center (1) and may have attempted to engage in tax evasion. Accordingly, the tax office may conduct further investigation to determine whether the merchant has attempted to evade paying taxes.

The present invention prevents merchants from concealing trades with the aid of customer tax declarations. If the transferring of the customer tax declaration information by the customer to the tax control center (1) is lacking, it is difficult to determine whether the merchant has concealed any trades. In order to encourage the customer to transfer the customer tax declaration information, the tax control center (1) may hold a raffle regularly, raffling several prizes to customers who have transferred customer tax declaration information, and the customers may claim their prizes with their tax declaration cards (4). For example, a small raffle may be held weekly, with 1,000 winters and a $1,000 prize for each winner, a big raffle may be held monthly, with 10 winners and a $1,00,000 prize for each winner; and a grand raffle may be hold annually, with 1 winner and a $10,000,000 prize. With such raffles, the customers would be encouraged to declare tax information after their trades, and thereby would preclude the merchants from evading taxes by concealing trade records.

According to the present invention, the tax declaration card (4) includes the receipt printed for the customer by the merchant; that is to say, the customer may use the receipt as the tax declaration card (4) which records an invoice serial number, a sum of payment, the name of the store/merchant, the time and date, etc. After making a payment, by placing the receipt onto the tax declaration machine (3), the tax declaration machine (3) will automatically scan the contents of the receipt and transfer the contents to the tax control center (1) as the customer tax declaration information. In addition, the tax declaration card (4) may be a non-contact intelligent card, such as a Metro Card, a Hong Kong's Octopus Card, a Visa payWave card, and so on. Alternatively, the tax declaration card (4) can be a credit card, debit card, or cash card, set up with an intelligent card chip. The customer can make payments with such tax declaration cards (4) equipped with intelligent card chips, or can use other measures to make payments, and then place the tax declaration card (4) on the tax control POS terminal (2) in the shop after payment. The tax control POS terminal (2) will automatically write the trade record, i.e., the customer tax declaration information, onto the card. Therefore, the tax declaration card (4) will record an invoice serial number, a sum of payment, the name of the store/merchant, the time and date, and other customer tax declaration information. After making the payment, the customer may place the tax declaration card (4) on the tax declaration machine (3), which will automatically read the customer tax declaration information in the tax declaration card (4) and transfer it to the tax control center (1).

Figure 3:
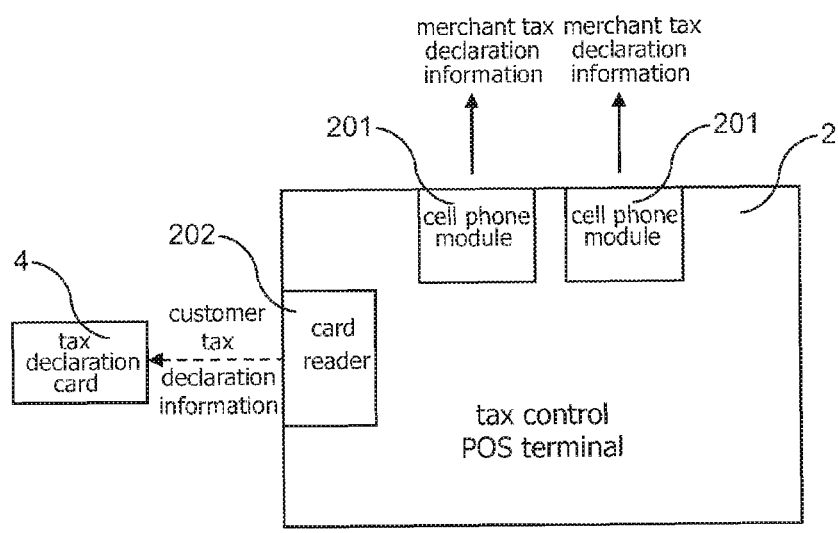
FIG. 3 is a structure diagram of the tax control POS terminal (2) according to an embodiment of the present invention.

Referring to FIG. 3, showing a structure diagram of the tax control POS terminal (2) according to an embodiment of the present invention; the tax control POS terminal (2) is illustrated with its corresponding tax declaration card (4) equipped with an intelligent card chip. The illustrated tax control POS terminal (2) comprises two cell phone modules (201) and a card reader (202). The cell phone modules (201) transfer the merchant tax declaration information to the tax control center (1) via mobile telecommunication network (5). Among the two cell phone modules (201), one serves as a host and the other as a backup, and they may be adapted to different mobile networks, for example, the networks of China Mobile and China Unicom, respectively. When one cell phone module (201) fails, another cell phone module (201) may replace it to serve the task of communicating with the tax control center (1).

Continue to refer to FIG. 3, the illustrated card reader (202), as a read-write device for intelligent cards, is used to read and write the customer tax declaration information to and from the tax declaration card (4). The card reader (202) writes customer tax declaration information into the tax declaration card (4). If the tax declaration card (4) is a non-contact intelligent card, the card reader (202) is a non-contact read-write device for non-contact intelligent cards. If the tax declaration card (4) is a bank card with an intelligent card chip, then the card reader (202) is the POS terminal for the bank card. Upon payment, the tax control POS terminal (2) writes trade information, including the sum of the payment, the name of the store/merchant, the time and date, and other customer tax declaration information, onto the tax declaration card (4) using the card reader (202). After making the payment, the customer may put the tax declaration card (4) on the tax declaration machine (3), which will automatically read the customer tax declaration information from the tax declaration card (4) and transfer it to the tax control center (1).

Figure 4:
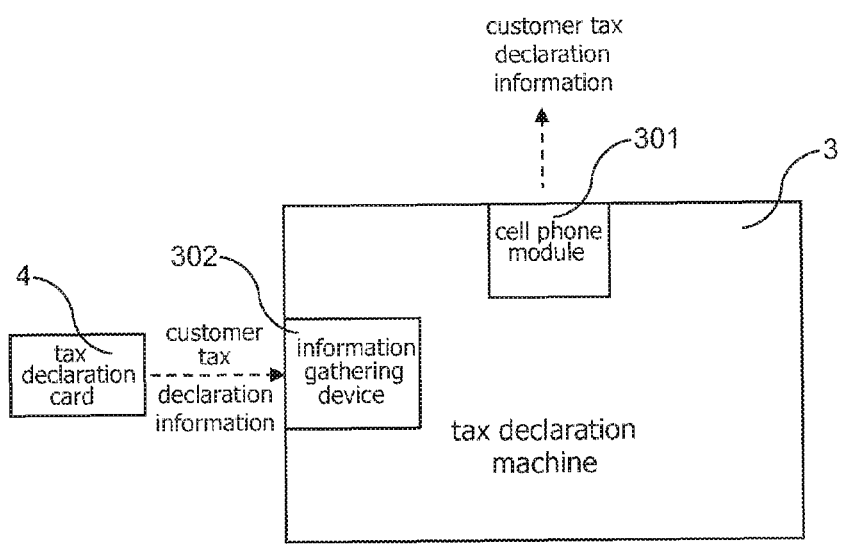
FIG. 4 is a structure diagram of the tax declaration machine (3) according to an embodiment of the present invention.

Referring to FIG. 4, showing the structure diagram of the tax declaration machine (3) according to the present invention, the illustrated tax declaration machine (3) is mainly used to transfer customer tax declaration information to the tax control center (1). The tax declaration machine (3) comprises a cell phone module (301) for conducting digital communication with the tax control center (1) via mobile telecommunication network (5). The tax declaration machine (3) further comprises information gathering device (302) for reading the tax declaration card (4). If the sales receipt is used as the tax declaration card (4), the information gathering device (302) is an image scan device capable of scanning the contents of the receipt to images and then transmitting the images to the tax control center (1) via mobile telecommunication network (5) to declare the tax. If an intelligent card is used as the tax declaration card (4), then the information gathering device (302) is an intelligent card read-write device, and the tax declaration machine (3) reads the customer tax declaration information stored on the tax declaration card (4) using the intelligent card read-write device, and transfers the information to the tax control center (1) via mobile telecommunication network (5) to declare the tax.

Additionally, the tax declaration card (4) may further record the serial number of the sold product and/or its sales price. Then the government can gather this data, produce statistics of the transaction, including the price and shipment, of each kind of product, and thereby calculate the related trade data.

The system and method for automatically declaring sales taxes according to the present invention have been described herein in detail with reference to selected embodiments. However, the present invention is not so limited. The present invention is intended to embrace all such alterations, modifications and variations that fall within the spirit and scope of the appended claims.

The system and method for automatically declaring sales tax according to the present invention can effectively present tax evasion by merchants. Implementation of the present invention would facilitate tax declarations by merchants, and meanwhile would prevent tax evasion by merchants; thereby guaranteeing that the state would receive all of the tax revenue to which it is due.

The invention claimed is:

1. An automatic sales tax declaration system that inhibits a merchant from concealing a trade, comprising:
   a tax control center;
   a tax declaration point of sale (POS) terminal at a shop, the POS terminal being usable by a merchant to collect a payment;
   a tax declaration machine; and
   a customer tax declaration card;
   wherein the POS terminal is able to digitally communicate with the tax control center via a mobile telecommunication network, the tax declaration machine is able to digitally communicate with the tax control center via the mobile telecommunication network, and,
   wherein when a customer makes a purchase in the shop, and the merchant collects a payment from the customer using the POS terminal, the POS terminal is configured to transfer customer tax declaration information to the customer's tax declaration card, and to transfer merchant tax declaration information to the tax control center via the mobile telecommunication network, and
   wherein if the customer puts the tax declaration card containing the customer tax declaration information onto or into the tax declaration machine, the tax declaration machine will read the customer tax declaration information from the tax declaration card and will transfer it to the tax control center via the mobile telecommunication network, thereby inhibiting the merchant from concealing a trade, and the tax control center will calculate a sales tax applicable to the merchant based on the received customer tax declaration information and the merchant tax declaration information.

2. The automatic sales tax declaration system of claim 1, wherein the tax control center, based on the received customer tax declaration information, will examine the corresponding merchant tax declaration information, and if the corresponding merchant tax declaration information is absent, the tax control center will determines that the merchant may not have transferred the corresponding merchant tax declaration information to the tax control center.

3. The automatic sales tax declaration system of claim 1, wherein the tax declaration card is a receipt printed by the merchant for the customer.

4. The automatic sales tax declaration system of claim 1, wherein the tax declaration card is a non-contact intelligent card that can be used for making payments.

5. The automatic sales tax declaration system of claim 1, wherein the customer tax declaration information recorded on the tax declaration card includes an invoice number, a sum of a payment, a time and date, and a name of a store or a merchant.

6. The automatic sales tax declaration system of claim 5, wherein the customer tax declaration information recorded on the tax declaration card further includes at least one of a serial number of a sold product and a sales price of the sold product.

7. The automatic sales tax declaration system of claim 1, wherein the tax control POS terminal comprises cell phone modules, through which the tax control POS terminal can access the mobile telecommunication network to digitally communicate with the tax control center.

8. A method for automatic sales tax declaration and for inhibiting a merchant from concealing a trade, the method comprising:
   establishing a tax control center;
   installing a tax declaration machine at a location that is accessible to a customer;
   locating a tax control point of sale (POS) terminal at a shop operated by a merchant;
   using by the merchant of the POS terminal to receive a payment from the customer for a trade;
   transferring by the tax control POS terminal of customer tax declaration information to a customer tax declaration card;
   transferring by the tax control POS of merchant tax declaration information to the tax control center by means of a telecommunication network;
   providing the customer tax declaration card to the customer;
   placing by the customer of the tax declaration card onto or into the tax declaration machine;
   obtaining by the tax declaration machine of the customer tax declaration information from the customer tax declaration card;
   transferring by the tax declaration machine of the customer tax declaration information to the tax control center using the telecommunication network, thereby inhibiting the merchant from concealing the trade; and
   calculating by the tax control center of a sales tax applicable to the merchant according to the customer tax declaration information and the merchant tax declaration information.

9. The method of claim 8, further comprising:
   attempting by the tax control center to compare the customer tax declaration information with the corresponding merchant tax declaration information; and
   if the corresponding merchant tax declaration information is found to be absent, determining that the merchant may not have transferred the corresponding merchant tax declaration information to the tax control center.

10. The method of claim 8, wherein the tax declaration card is a receipt that is printed by the merchant and provided to the customer.

11. The method of claim 8, wherein the tax declaration card is a non-contact intelligent card that can be used for making a payment.

* * * * *